(12) United States Patent
Eyme

(10) Patent No.: US 10,247,874 B2
(45) Date of Patent: Apr. 2, 2019

(54) EDGE-LIT GLASS WALL SYSTEM

(71) Applicant: Florian Eyme, Lyons (FR)

(72) Inventor: Florian Eyme, Lyons (FR)

(*) Notice: Subject to any disclaimer, the term of this patent is extended or adjusted under 35 U.S.C. 154(b) by 0 days.

(21) Appl. No.: 15/883,898

(22) Filed: Jan. 30, 2018

(65) Prior Publication Data

US 2018/0217319 A1 Aug. 2, 2018

Related U.S. Application Data

(60) Provisional application No. 62/451,798, filed on Jan. 30, 2017.

(51) Int. Cl.
| | |
|---|---|
| *A47F 11/10* | (2006.01) |
| *F21V 8/00* | (2006.01) |
| *E04B 2/96* | (2006.01) |
| *E06B 3/54* | (2006.01) |
| *E06B 3/02* | (2006.01) |
| *E06B 3/663* | (2006.01) |

(52) U.S. Cl.
CPC ............ *G02B 6/0073* (2013.01); *E04B 2/962* (2013.01); *E06B 3/02* (2013.01); *E06B 3/5454* (2013.01); *E06B 3/66376* (2013.01)

(58) Field of Classification Search
CPC ........ A47F 3/0434; A47F 3/001; A47F 11/10; F21Y 2115/10; F21Y 2105/00; G02B 6/0073; G02B 6/0068; E04B 2/962; E04B 3/02; E06B 3/545; E06B 3/66376
See application file for complete search history.

(56) References Cited

U.S. PATENT DOCUMENTS

| | | | | | |
|---|---|---|---|---|---|
| 5,276,591 | A | * | 1/1994 | Hegarty | G02B 6/0036 |
| | | | | | 362/2 |
| 5,810,468 | A | * | 9/1998 | Shimada | F21S 8/032 |
| | | | | | 362/146 |
| 6,606,827 | B1 | * | 8/2003 | Hoffmann | G09F 13/22 |
| | | | | | 362/146 |
| 9,335,464 | B2 | * | 5/2016 | Grigore | G02B 6/0091 |
| 9,394,687 | B2 | * | 7/2016 | Gierens | F21V 33/006 |
| 9,443,453 | B2 | * | 9/2016 | Fallon | G09F 13/18 |
| 9,448,357 | B2 | * | 9/2016 | Mueller | B32B 17/10055 |
| 9,500,354 | B2 | * | 11/2016 | Gierens | E06B 3/66 |
| 9,664,835 | B2 | * | 5/2017 | Kleo | F21V 33/0012 |
| 9,801,474 | B2 | * | 10/2017 | Trulaske, Sr. | A47F 3/001 |
| 9,864,125 | B2 | * | 1/2018 | Gierens | G02B 6/0043 |

(Continued)

*Primary Examiner* — Brian E Glessner
*Assistant Examiner* — Daniel J Kenny
(74) *Attorney, Agent, or Firm* — Gordon Feinblatt LLC; Royal W. Craig

(57) ABSTRACT

A glass space partitioning system that is capable of supporting heavy and/or operable glass panels in throughout a range of partially-integrated or fully-integrated configurations, and which integrates an LED-strip light assembly for edge-lighting the glass panels. The system generally includes a framing member comprising a U-shaped horizontal profile with side walls, an intermediate profile attached to the U-shaped profile, a glass pane seated edgewise between a side wall of the U-shaped profile and the intermediate profile, a flexible LED strip cut to length and snap-fit in a vertical orientation against the side wall of the U-shaped profile and adjacent the glass pane for edge lighting, and a cover profile attached to the intermediate profile securing the foregoing.

15 Claims, 3 Drawing Sheets

(56) References Cited

U.S. PATENT DOCUMENTS

2001/0036072 A1* 11/2001 Baker .................... F21S 8/032
                                                    362/146
2006/0018126 A1   1/2006 Choi
2007/0133192 A1*  6/2007 Alessandro ........... A47F 3/0434
                                                    362/125

* cited by examiner

EDGE-LIT GLASS WALL SYSTEM

CROSS-REFERENCE TO RELATED APPLICATION(S)

The present application derives priority from U.S. Provisional Patent Application U.S. Provisional Patent Application 62/451,798 filed Jan. 30, 2017.

BACKGROUND OF THE INVENTION

1. Field of the Invention

The present invention relates generally to glass wall panel systems for interior spaces and more specifically to an LED-edge-lit wall panel system.

2. Background of the Invention

Wall panel systems are well-known for creating various workspaces and displays in office and residential environments, e.g., partitions, display cases, etc. The panels used are sometimes glass, which creates openness, light transmission and visual communication through the glass wall panels.

The light-transmissive properties create opportunity for interesting lighting effects. For example, it is well-known how to edge-light glass panels in other contexts. See, for example, United States Patent Application 20060018126 by Choi which discloses a fluorescent-edge-lit panel for bulletin boards. The fluorescent light source opposes a semi-circular reflector that direct the light into the edge surface of the glass.

U.S. Pat. No. 5,276,591 issued to Hegarty sets forth a sign with indirect illumination from light emitting diodes using high brightness LEDs and a translucent graphic panel with suitable opacity for the transmission of light.

However, such lightweight, extruded aluminum frame systems as described above cannot readily support heavy panels, panes of tempered glass, glass doors, or other glass partitioning components that impose dynamic loading conditions. Large glass wall panels are heavy and typically require a specialized framing assembly. An optimal frame track configuration has sufficient inherent load-bearing capacity for an entire range of possible glass configurations so as to provide ample structural support in all such cases.

It is not so easy to incorporate an edge-lighting assembly into a large-scale edge-lit glass wall system without unduly increasing the cost and complexity of the assembly process.

What is needed is a glass space partitioning system that is capable of supporting heavy and/or operable glass panels in throughout a range of partially-integrated or fully-integrated configurations, and which integrates an LED-strip light assembly for edge-lighting the glass panels.

SUMMARY OF THE INVENTION

It is, therefore, an object of the present invention to provide an edge-lit glass space partitioning system that is capable of supporting heavy and/or operable glass panels in throughout a range of partially-integrated or fully-integrated configurations, and which integrates an LED-strip light assembly for edge-lighting the glass panels.

The system utilizes a horizontal framing member preferably formed of extruded aluminum and having snap-fit profiles inclusive of a U-shaped horizontal profile with side walls, an intermediate profile attached to the U-shaped profile, and a cover profile attached to the intermediate profile. The U-shaped profile includes a horizontal base portion extending upward at distal rails to form a U-shaped element. Within the U-shape is a central elevated plateau flanked on either side by troughs formed between vertical side walls. One or two glass panes may be seated one on each side vertically within each corresponding trough. A flexible LED strip 70 is fitted within an alcove between the intermediate profile and glass pane, exposing the LEDs vertically to the glass pane(s) proximate their edge, which illuminates each glass panels indirectly from the bottom side, providing more of a uniform full-pane backlit effect than most edge lighting.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is an edge-lit glass wall system for constructing glass partitioning with heavy and/or operable glass panels in a range of partially-integrated or full-integrated configurations, with an integrated LED-strip light assembly for illumination effect.

Figure 1:
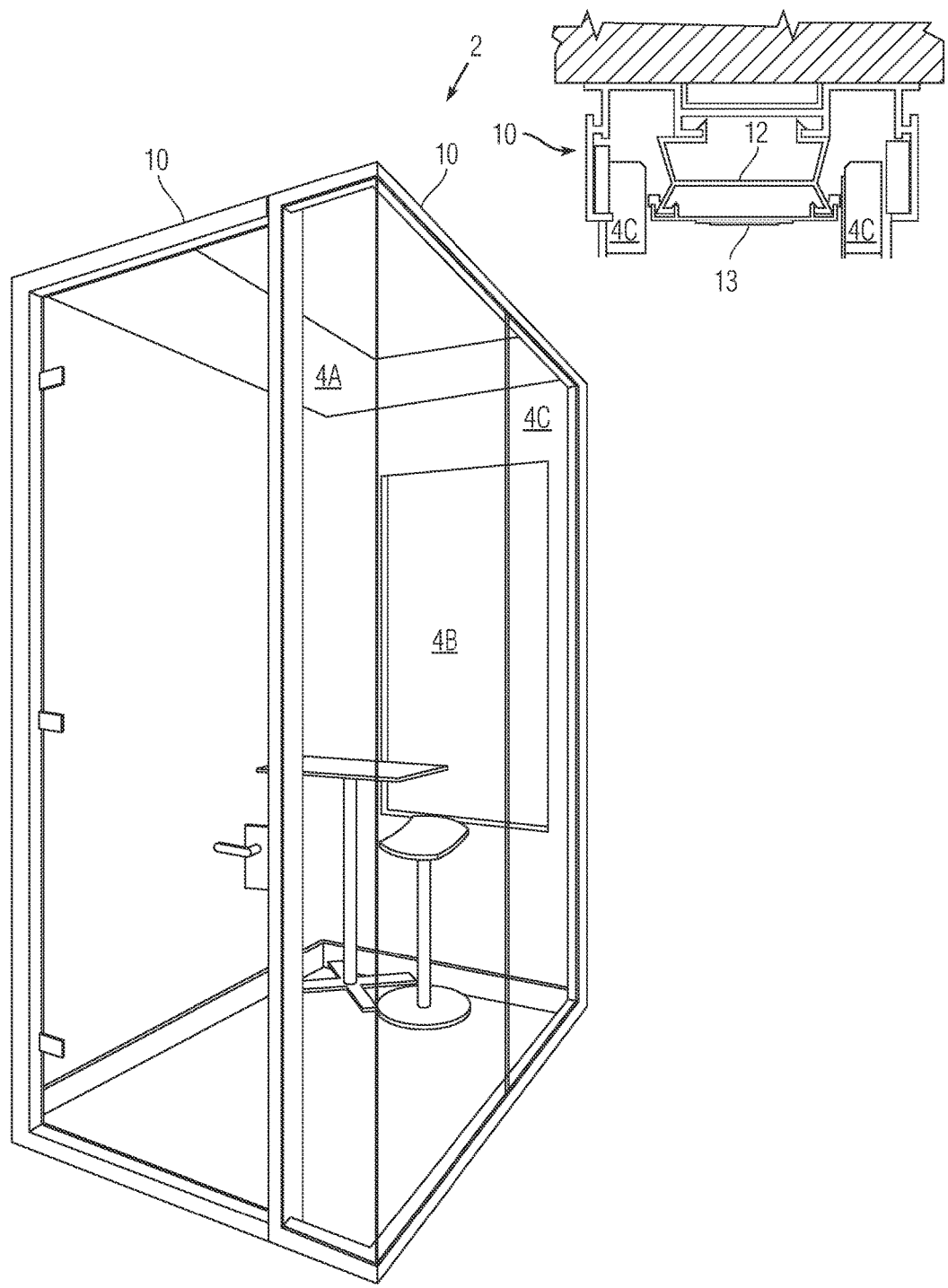
FIG. 1 is a perspective view of an edge-lit glass wall system 2 according to the invention configured with top and bottom illumination.

With specific reference to FIG. 1, the illustrated edge-lit glass wall system 2 is configured with top and bottom illumination as shown, though side and/or medial illumination is also possible. The edge-lit glass wall system 2 generally comprises a plurality of upper and lower framing members 10 securing glass panels 4A, 4B, 4C, etc., the latter each being a rectangular panel with beveled edges as shown in the enlarged inset. The width of the glass panels may vary as a matter of design choice, but are most ¼", ⅜" or ½" thick single or double pane glass panels of clear safety glass.

Figure 2:
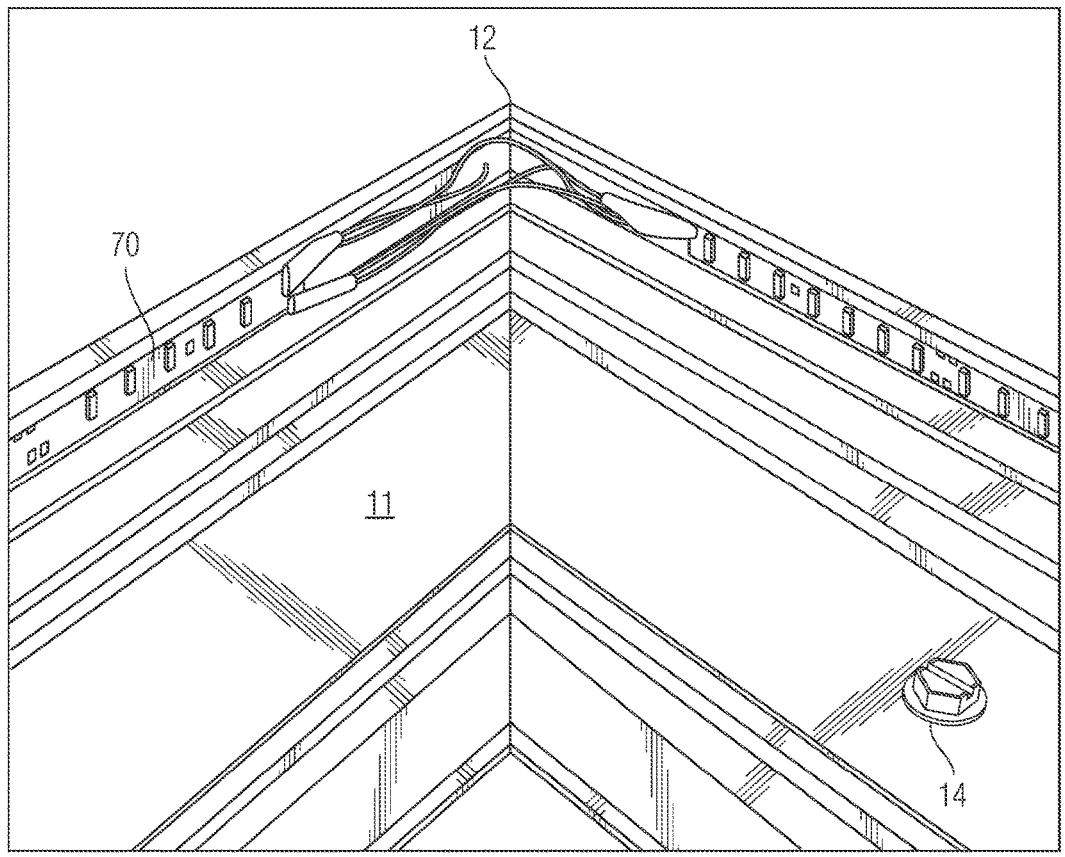
FIG. 2 is a perspective view of the underside of edge-lit glass wall system 2 showing LED strips 70.

Each glass panel 4A, 4B, 4C is journaled at top and bottom into a framing member 10. Framing members 10 individually comprise several extruded aluminum interfitting profiles 11-13 each having a particular cross-section, the outermost U-profile 11 being attached to a ceiling or floor as shown in FIGS. 1-2. Pairs of framing members 10 may be joined at various angles to form corners 12.

Figure 3:
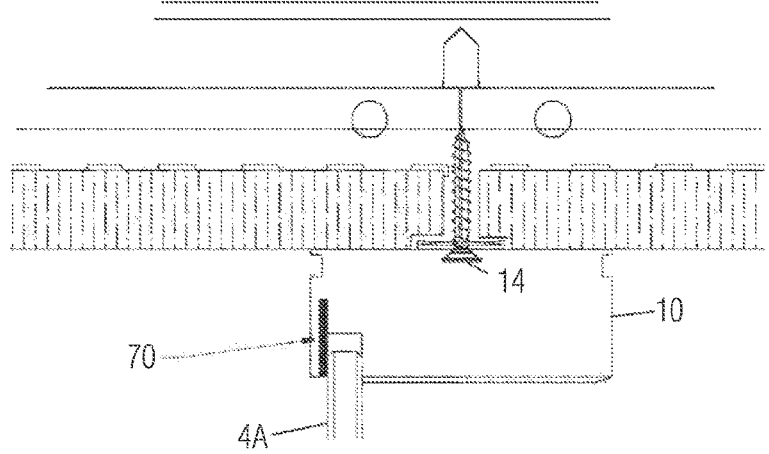
FIG. 3 is a perspective view of the underside of the U-shaped profile 11 of a framing member 10 showing LED strip 70.

As seen in FIG. 3, the framing members 10 are secured to a supporting structure such as a wall, ceiling or floor by self-tapping screws 14 inserted there through. The framing members 10 each define two vertical cavities into which one or two glass panels 4 may be seated, and within which a flexible LED strip 70 "snap fits", exposing the LEDs vertically to the glass panels 4 instead of horizontally.

Figures 4, 5:
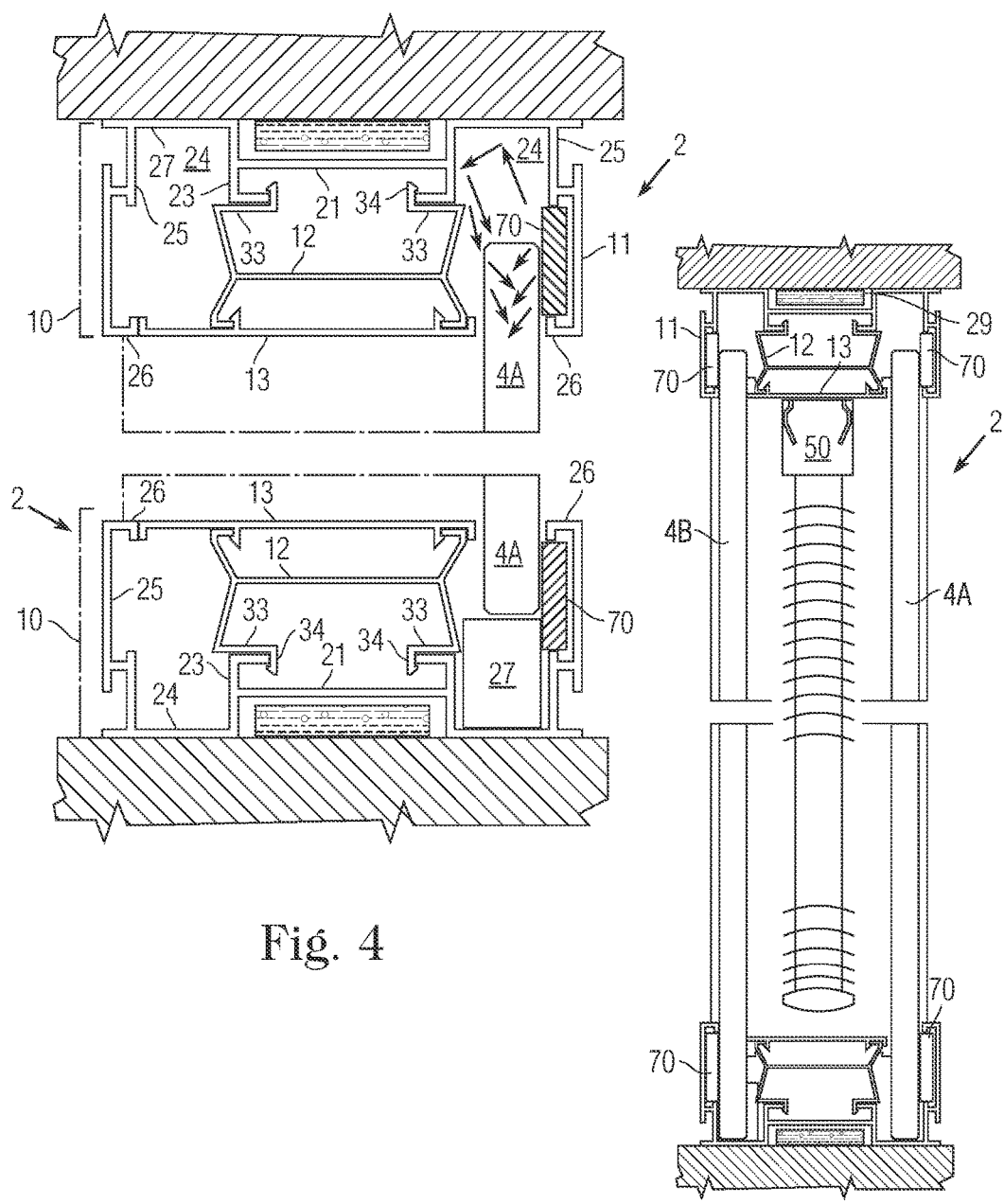
FIG. 4 is a side cross-section of two framing members 10 secured to a ceiling and floor with a single glass pane 4A installed.
FIG. 5 is a side cross-section of two framing members 10 secured to a ceiling and floor with two glass panes 4A, 4B installed and inclusive of a vertical blind 50 according to the present invention.

FIG. 4 illustrates two opposing framing members 10 each inclusive of its interfitting profiles 11-13 to be described. As demonstrated at top right, the above-described configuration facilitates a forward illumination of all glass panels 4A-C proximate their top/bottom edge, which illuminates each glass panel 4A-C indirectly from the top/bottom side, providing more of a uniform full-pane backlit effect than most edge lighting.

In practice, both a top framing member 10 and identical bottom framing member 10 will be provided, one each at both the lower extremity of glass panels 4A-C (typically at the floor) and at the upper extremity of the partition wall (typically at the ceiling). The top framing member 10 may be attached to an overhead portion of the surrounding building structure such as a ceiling, dropped ceiling, bulkhead, joist, beam etc. However, one skilled in the art should understand that the overhead building elements need not be continuous and indeed the partition wall need not be full height. In such case the top framing member 10 may be intermittently attached overhead or minimally attached at both ends to the structure of the surrounding building. The bottom framing member 10 is typically in contact with the floor slab or other floor surface and is preferably mechanically affixed to the floor surface as by screws or the like. The top and bottom framing members 10 are positioned in vertical alignment with one another and trace the horizontal path of the partition wall through and within the space to be divided.

As seen in FIG. 4 each framing member 10 is characterized by its plurality of interfitting profiles 11-13 inclusive of a U-profile 11, intermediate profile 12, and a cover profile 13. The U-profile 11 is formed as a roughly U-shaped cross section open frontally and with a plurality of projecting appendages as will be described. The entire framing member 10 is preferably symmetrically situated about a centerline, and is configured for mounting one glass pane 4A as shown in FIGS. 3-4, or two 4A, 4B as shown in FIG. 5. Each pane of glass 4A, 4B is edge-mounted, a single pane 4A on the front side of the framing member 10 or a double pane 4A, 4B on both sides of the framing member 10 as illustrated.

The U-profile 11 is defined by a floor having a raised plateau 21 elevated above two opposing recessed pocket sections 24. The plateau 21 may be reinforced by a plurality of longitudinal reinforcing ribs. The two opposing recessed pocket sections 24 are bounded on the outside by raised walls 25. The walls 25 rise substantially flat but each includes converging lips 26 bounding the open-face of U-profile 11. The walls 25 have a degree of inherent resiliency that allows lips 26 to be spread slightly. The junction of the walls 25 and lips 26 of the U-profile and adjacent pane of glass 4A defines a first interior space for insertion of a flexible LED strip 70, the pane 4A being inserted between the junction of the intermediate profile 12, cover profile 13 and wall 25 of U-profile 11 toward the recessed pocket section 24. This configuration vertically-positions each pane of glass 4A, 4B within the framing member 10 immediately adjacent a corresponding LED strip 70 for effective edge-lighting. It should be noted that the advantage of this concept is that no screwing is necessary. The assembly takes place by snap-fitting, likewise for the dismantling.

Each flexible LED strip 70 is cut to length and snap-fit in a vertical orientation within the alcove defined by the walls 25 and lips 26 of U-profile 11 and insertion of the pane of glass 4A. The inherent resiliency of the walls 25 provides for a snap-fit. This effectively captures the LED strip 70 therein adjacent the glass panel 4A, 4B. The LED strip 70 is preferably a flexible LED light strip. The LED strip 70 is preferably but not necessarily waterproof, preferably white but may be any color. And preferably cuttable to length (e.g., every one, two or three LEDS, for example) without damaging the rest strip. If desired, the LED light strip 70 may be adhered to the inside of walls 26 of the U-profile 11 by adhesive tape or glue. Importantly, the LED light strip 70 frontally illuminates the glass pane(s) 4A, 4B and a significant amount of the light reflects immediately from the beveled edges of the glass pane(s) 4A, 4B upward through and along the glass pane(s) 4A, 4B, promoting the diffuse edge-lighting effect. Moreover, the angular surfaces of the opposing intermediate profile 12 and cover profile 13 serve to reflect the light back into the pane(s) 4A, 4B to increase illumination.

If desired, a plastic or wood shim/glass support 27 may be provided in troughs 24 of U-profiles 11 to cushion the glass panes 4A, 4B, and this is especially preferred in the bottom-most framing member 10 which endures the weight of the pane(s) 4A, 4B.

The intermediate profile 12 is generally in the shape of an H. The legs of each H-shaped intermediate profile 12 contain a picked pin 34 cooperating with edges 23 of the bottom of the U-profile 11 to assure a satisfactory snap-lock fixation. The extremities of the legs of H also each contain a flat zone 33, parallel to the plan of the bottom of the U-profile 11 to assure a satisfying support on edges 23. In a similar way, the arms of the intermediate profile 12 each have a flat edge 27 parallel to the plan of the bottom of the U-profile 11 for support.

The cover profile 13 covers the open face of framing member 10 up to the glass panes 4A and/or 4B. Cover profile 13 snap-locks in place via two picked pins 44 intended to cooperate with the outer arms of the intermediate profile 12. In this way, the assembly of the cover profile 13 in approximate emergence with the extremities of the U-profile 11 is made particularly easy because it comes by the simple fitting of the cover profile 13 to the intermediate profile 12. One skilled in the art should understand that interlocking picked pins are purely examples, and that other snap-fit mechanisms are possible, in particular, inverted pins and edges. If panes 4A, 4B are inserted, the cover profile 13 is dimensioned so as not to cover the totality of the opening of the U-profile 11.

If desired, the raised plateau 21 of U-profile 11 provides a space between the floor/ceiling surface within which a strip of insulation 29 may be inserted and/or adhered.

Installation or assembly of a partition wall 2 according to the present invention starts by securing a length of the U-profile 11 on the floor of the space to be partitioned, along the path of the desired partition. As previously described the U-profile 11 may be typically secured to the floor mechanically as by screws 14 or the like. Due to the cross sectional shape of the U-profile 11, the U-profile 11 will accommodate irregularities in the floor surface such as non-flat and non-level areas so that no elastomeric filler/sealer nor mechanical adapter is required between the U-profile 11 and the floor surface. Additionally, it is not necessary for the installer to take any steps to shim, level or otherwise modify the U-profile 11 relative to the floor surface. The intermediate profile 12 is then snap-fit in place and positioned/adhered against the angular wall of intermediate profile 12. Each flexible LED strip 70 is cut to length and fit/adhered flush in a vertical orientation within the alcove defined by the walls 25 and lips 26 of the U-profile 11. An optional rubber seating gasket 27 is, if desired, inserted. Next, a glass pane 4A, 4B is inserted, and an appropriately-sized cover profile 13 snap-fit in place to secure the foregoing components.

As seen in FIG. 4 contrasted to FIG. 5, one or two glass panes 4A, 4B may be introduced. Each glass pane 4A, 4B may be opaque, translucent or transparent. The height of the glass panes 4A, 4B is selected based on the ultimate height of the partition wall as determined by the vertical spacing between the top and bottom framing members 10. The glass pane 4A is installed by inserting its bottom edge into the trough 24 of bottom framing member 10, engaged against the resilient gasket in the trough 24, then bowing the pane 4A until the top edge slides between the U-profile 11 and intermediate profile 12 toward the trough 24 of the top framing member 10. If needed, the intermediate profile 12 may be removed and reinserted to facilitate this, and the upper cover profile 13 is lastly snap-fit in place.

The LED light strips 70 are connected via an on/off switch to a low-voltage 12V DC power supply, and the switch is turned on the edge-light the panes 4A, 4B.

FIG. 5 is a top cross-section of the edge-lit glass wall system 2 inclusive of a blind 50 according to the present invention. With either one or two opposing glass panes 4A, 4B, there is ample space to install a blind 50 such as a conventional vertical blind is pictured, venetian blind, drapes or the like in order to selectively obscure the interior-partitioned space. Blind 50 may be secured in a conventional manner to the opposing cover profiles 13 as illustrated.

It should now be apparent that the above-described apparatus effectively provides a glass space partitioning system that is capable of supporting heavy and/or operable glass panels in throughout a range of partially-integrated or fully-integrated configurations, and which integrates an LED-strip light assembly for edge-lighting the glass panels.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An edge-lit glass partition, comprising:
   a rectangular pane of glass having a top edge and a bottom edge; and
   at least one batten for affixing said top edge or said bottom edge to a corresponding ceiling or floor, said batten comprising a first framing member formed with a constant lengthwise cross-sectional profile generally-U-shaped with a floor, and a pair of opposing sidewalls protruding perpendicularly from said floor, both sidewalls including an alcove, and a second framing member snap-fit to a central elevated plateau of the floor of the first framing member; and;
   an LED lighting strip adhered within one of said alcoves.

2. The edge-lit glass partition according to claim 1, wherein said rectangular pane of glass has a beveled top edge and a beveled bottom edge.

3. The edge-lit glass partition according to claim 1, further comprising a ceiling batten for affixing said top edge to said ceiling and a floor batten for affixing said bottom edge to said floor.

4. The edge-lit glass partition according to claim 3, wherein said ceiling batten and said floor batten both comprise an identical constant lengthwise cross-sectional profile.

5. The edge-lit glass partition according to claim 4, wherein said alcoves are C-shaped with opposing lips.

6. The edge-lit glass partition according to claim 5, wherein said sidewalls are resilient at said C-shaped alcoves to allow spreading of said lips and compression fitting said LED light strips therein.

7. The edge-lit glass partition according to claim 6, wherein said LED lighting strip projects light laterally into said glass pane.

8. The edge-lit glass partition according to claim 1, wherein said second framing member is H-shaped.

9. The edge-lit glass partition according to claim 8, wherein said batten further comprises a third framing member snap-fit to the second framing member.

10. A system for installing an edge-lit glass interior partition comprising:
    a longitudinal framing member having:
       a substantially U-shaped profile comprising an horizontal floor disposed along a midline, a longitudinal elevated plateau formed in said floor and centered on said midline and, at each distal end of said floor, a side wall of the U-shaped profile protruding therefrom,
       a recessed trough formed in said floor between said plateau and each side wall,
       an intermediate profile releasably attached to said U-shaped profile,
       a cover profile releasably attached to said intermediate profile;
       at least one glass pane seated in a recessed trough between said intermediate profile and a side wall of said U-shaped profile; and
       a flexible LED light strip attached to a side wall.

11. The system for installing an edge-lit glass interior partition according to claim 10, wherein each said side wall of the U-shaped profile has an alcove.

12. The system for installing an edge-lit glass interior partition according to claim 11, wherein each said alcove is C-shaped.

13. The system for installing an edge-lit glass interior partition according to claim 12, wherein each C-shaped alcove has opposing lips.

14. The system for installing an edge-lit glass interior partition according to claim 13, wherein said sidewalls of the U-shaped profile are resilient at said C-shaped alcoves to allow spreading of said lips and compression fitting said LED light strips therein.

15. The system for installing an edge-lit glass interior partition according to claim 14, wherein said LED lighting strip projects light laterally into said glass pane.

* * * * *